United States Patent [19]
Fisch

[11] 3,944,184
[45] Mar. 16, 1976

[54] PULLING ATTACHMENT FOR ELBOW

[76] Inventor: Reinhold Fisch, 29 Elenor Place, Yonkers, N.Y. 10705

[22] Filed: May 8, 1975

[21] Appl. No.: 575,899

[52] U.S. Cl. ......................................... 254/134.3 R
[51] Int. Cl.² .......................................... B66D 1/36
[58] Field of Search ............ 254/134.3 R, 134.3 FT, 254/190, 195, 196; 174/72

[56] References Cited
UNITED STATES PATENTS

| | | | |
|---|---|---|---|
| 1,147,792 | 7/1915 | Early | 254/134.3 R |
| 2,515,724 | 7/1950 | McCroskey | 254/134.3 R |
| 2,665,147 | 1/1954 | Wiesmann | 254/134.3 R |
| 2,746,715 | 5/1956 | Sherrod | 254/134.3 R |
| 3,020,332 | 2/1962 | Appleton | 254/134.3 R |

*Primary Examiner*—Al Lawrence Smith
*Assistant Examiner*—Robert C. Watson

[57] ABSTRACT

A pulling attachment for an elbow having a single threaded hole at opposite ends for use in passing heavy electrical cable through a conduit is described. The attachment comprises means for attaching a median portion to the threaded hole, and opposed outwardly and downwardly extending wing portions configured to fit over side walls of the pulling elbow. Means are connected to each of the wing portions for clamping same to the elbow side walls. A roller is mounted on the opposed wing portions so as to extend within the box to engage the cable.

9 Claims, 6 Drawing Figures

PULLING ATTACHMENT FOR ELBOW

This invention relates to a pulling attachment for an angle fitting or elbow for use in running cables through electrical conduit.

It is conventional in running heavy electrical cables through angled conduits to employ an angled fitting or elbow at their intersection connected to the angled conduits to assist in changing the direction of the cable. It is known from U.S. Pat. No. 3,020,332 to install rollers in the elbow ends for engaging the cable to avoid damage thereto from the cable engaging the elbow edges. This patent also discloses a roller attachment for use with an explosion-proof elbow having a pair of ears at each opposite end by means of which an access cover plate is mounted on the elbow.

However, elbows are also known having only a single threaded hole at each end for mounting of the access cover plate. The aforementioned patented attachment is not suitable for use with such single hole-ended elbows.

The main object of the invention is a novel attachment containing a roller for mounting on the end of a single hole-ended elbow to assist in pulling an electrical cable through the elbow without damage to the cable.

This and other objects and advantages of the invention as will appear hereinafter are achieved by an attachment construction characterized by a mounting plate having a center hole by means of which the attachment can be secured to the single threaded hole at the elbow end. Extending forwardly and downwardly from opposite ends of the mounting plate are opposed wing portions spaced apart so as to fit over the side walls of the elbow. Extending inward from each wing portion is a structural member adapted to extend within the elbow and onto which is journalled one end of a roller. Means are connected to the wing portions for clamping to the elbow side walls for securing the attachment to the elbow.

The invention will now be described in greater detail with reference to the accompanying drawing, wherein FIGS. 1 and 2 are a side and top view, respectively, of an elbow with the access cover removed and with one form of pulling attachment in accordance with the invention mounted at opposite ends illustrating how the passing of a cable through the elbow and adjoining conduits is facilitated;

Figure 3:
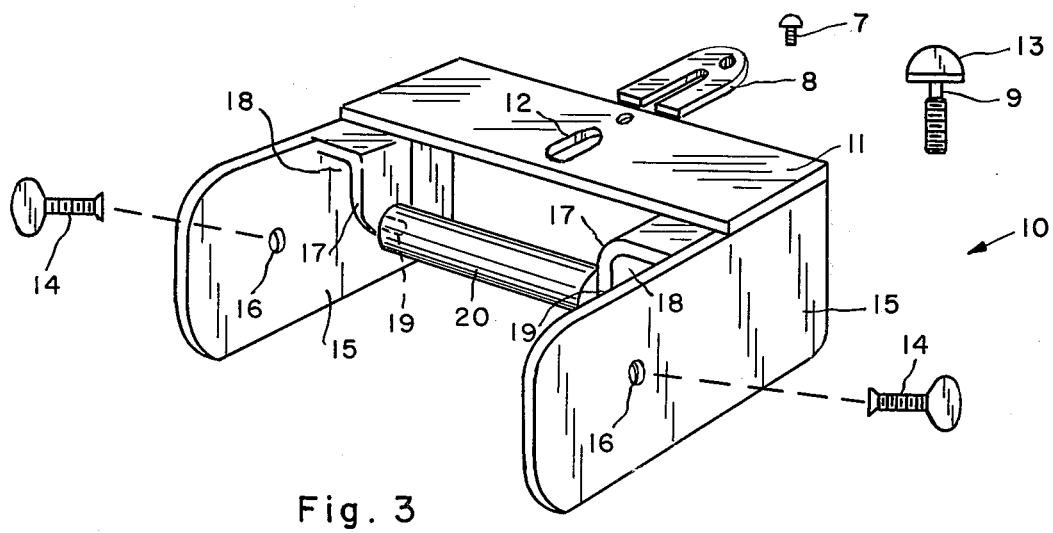
FIG. 3 is a perspective, partly exploded view of the pulling attachment shown in FIGS. 1 and 2.

Referring now to the drawing, FIG. 3 is a perspective, partly exploded view of one form of pulling attachment 10 in accordance with the invention. The pulling attachment comprises a mounting plate 11 having a clearance slotted aperture 12 at its center through which a top winged screw or bolt 13 can be passed.

Figure 3A:
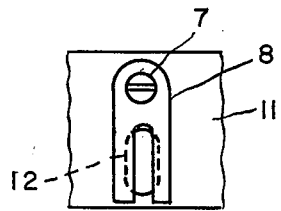
FIG. 3a is a detail view of the top.

A bifurcated screw-holding plate 8 is secured as by a screw 7 at the top of the mounting plate 11 (see FIG. 3a). The plate's slot engages a shank 9 of the top screw 13 to hold same in place on the attachment while permitting screw rotation. Extending forwardly and downwardly from each end of the mounting plate is a wing portion 15, also in the form of a plate. A threaded hole 16 is present in each wing portion 15, located forwardly of and below the mounting plate 11. It is engaged by a side winged screw or bolt 14. The mounting plate with wing portions 15 form a generally U-shaped configuration.

Extending inwardly from each edge of the wing portions 15, also downwardly is a roller support portion 17. The support portion 17 forms with the interior wall of the wing portion 15 a channel 18 into which the elbow side walls are received. Journalled 19 at the end of each support portion 17 is a roller 20, which thus extends parallel to but below the mounting plate 11.

Figure 1:
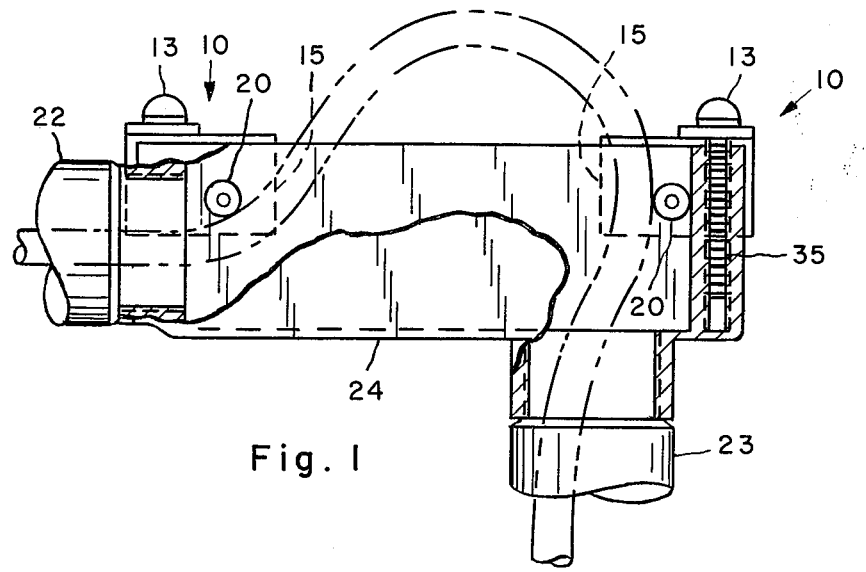
Figure 2:
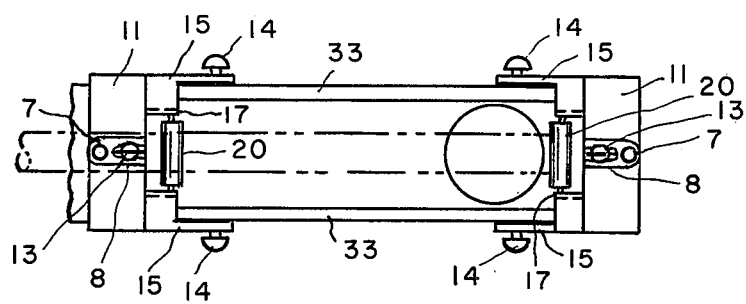
Figure 4:
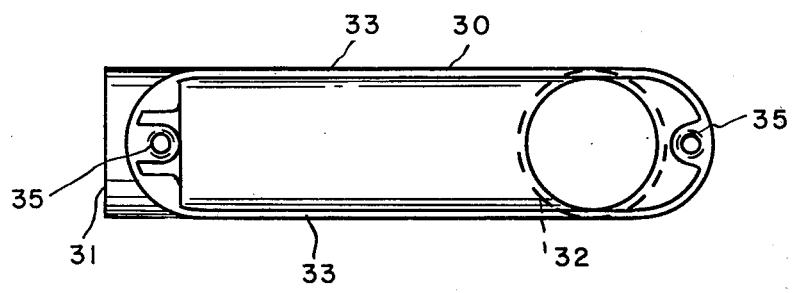
FIG. 4 is a top view of the elbow of FIG. 1 without the pulling attachments.
Figure 5:
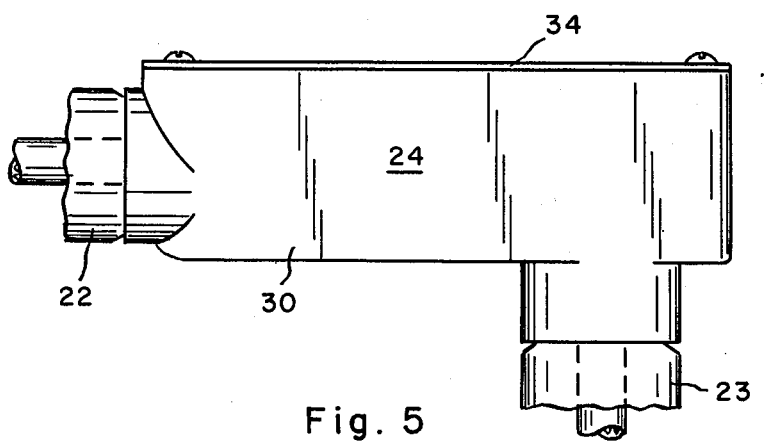
FIG. 5 is a side view of the elbow with the cover in place.

FIGS. 1 and 2 illustrate how the pulling attachment is installed and utilized. The angled conduits into which a heavy electrical cable is to be passed are shown at 22 and 23. An angled fitting or elbow 24 is connected at opposite ends. FIG. 5 illustrates the conduit construction with the cable installed and with a cover access plate in position. The elbow 24 comprises an elongated hollow cast body 30 having a conduit connection 31 at one end and at its bottom 32 at the opposite end. The elbow includes side walls 33 and an open top closed off by a cover access plate 34. As shown in FIG. 4, a single threaded hole 35 is provided at each end of the elbow by means of which the cover plate 34 may be secured to the elbow. The access cover plate is removed when the cable is installed, to enable the cable to be formed into a large loop extending through the open top, which simplifies installation of the cable. This is illustrated in FIG. 1 and 2. To avoid damaging the cable insulation, a pulling attachment 10 of the invention is installed at opposite ends of the elbow.

As will be observed from FIGS. 1 and 2, the attachment mounting plate 11 rests on the elbow end transversely to the elbow length. The top winged screw 13 is used to secure the mounting plate 11 to the threaded opening 35 at the elbow end. lessening The wing portions 15 fit over the outside of the elbow side walls 33, which extend into the channels 18 formed between the wing portions 15 and the roller support portions 17. Both side winged screws 14 are rotated in to engage the elbow side walls 33 thereby to clamp the attachment securely to the elbow. In this position the rollers 20 are located below the top edge of the elbow. When the cable is pulled through, it will engage at its upper side the rollers 20 rather than the elbow edges thereby reducing frictions to ease pulling, and lessesing the likelihood that the cable insulation will be damaged.

The slotted aperture 12 allows for a small longitudinal adjustment in the position of the attachment to accommodate different elbow constructions or optimize the pulling. The channels 18 are given a clearance spacing also to accommodate elbows of slightly different widths, the play being taken up by the side wing screws 14 when they are tightened against the elbow side walls. It will also be understood that winged screws 13 and 14, while convenient for easy attachment or detachment, are not essential, and oridinary screws or like fasteners can be used in their place. Also, while it is preferred to locate the rollers 20 below the elbow top, this is not essential, and the roller can be journalled if desired higher up on the support portions 17. It will also be understood that the top plate 11, wings 15, and roller supports 17 can be formed out of a single plate of metal, bent into shape illustrated, or formed from several individual pieces joined by suitable fasteners or other means to form the configuration illustrated in FIG. 3.

While the pulling attachment of the invention has been described for use with an elbow, it will be evident that it can also be used singly or in pairs with other electrical fittings coupling conduits through which a cable has to be passed to facilitate such passage. For example, there are fittings wherein one opening is located at the end but the other is at a side wall rather than at the bottom. In this case, the pulling attachment would be used only at the end opening. Even straight fittings can employ the pulling attachment of the invention, since it is easier to pull the cable through a conduit by forming a large loop through the open top of a connecting straight in which case rollers at both fitting ends will facilitate such operation.

What is claimed is:

1. A pulling attachment for use with an electrical fitting having opposed side walls, a bottom wall, an open top, and openings in its walls through which a cable can be passed, comprising a mounting plate, means on the mounting plate for attaching the mounting plate to the opposed side walls of the electrical fitting, said attaching means comprising means forming substantially parallel channels for fitting over and receiving the electrical fitting side walls, means connected to the channelforming means for engaging the fitting side walls for securing the attachment to the fitting, and a roller journalled on the attaching means and extending parallel to the mounting plate, said roller being located in a position such that when the attachment is mounted on the electrical fitting adjacent a wall opening and the cable passed through the opening and pulled through the open top, the upper side of the cable bears against the roller when viewed from the top.

2. A pulling attachment as claimed in claim 1 wherein the channel-forming means comprises wing portions extending outwardly and downwardly from opposed ends of the mounting plate.

3. A pulling attachment as claimed in claim 2 wherein the wing portions each comprise a plate for fitting over the outside of the fitting and a roller support portion for fitting inside the electrical fitting.

4. A pulling attachment as claimed in claim 3 wherein the roller is journalled on the roller-support portion such that it extends horizontally inside the fitting below its top.

5. A pulling attachment for use with an electrical fitting having at an end a single threaded hole for mounting of an access cover plate as claimed in claim 1 wherein the mounting plate has a center slot, and the attaching means further comprises a threaded screw for engaging the fitting threaded hole.

6. A pulling attachment as claimed in claim 5 wherein the attaching mean further comprises outwardly and forwardly extending wing portions and means on the wing portions for clamping same to the fitting side walls.

7. A pulling attachment as claimed in claim 6 wherein the clamping means comprise a screw threadingly engaging each wing portion for engaging and clamping to the fitting side walls.

8. A pulling attachment as claimed in claim 7 and further comprising screw-retaining means secured to the mounting plate and engaging the threaded screw which engages the fitting threaded hole.

9. A pulling attachment for use with an electrical fitting having opposed side walls and end walls, a bottom wall, an open top, openings in its walls through which a cable can be passed, and a single threaded opening in each end wall for securing an access cover plate to the open top, comprising a mounting plate, means on the mounting plate for attaching the mounting plate to the opposed side walls of the electrical fitting, said attaching means comprising downwardly extending means forming substantially parallel wing portions for fitting over the outside of the electrical fitting side walls, means connected to the wing portions for engaging the outside of the fitting side walls and means connected to the mounting plate for engaging an end wall threaded opening for clamping the attachment to the fitting, and a roller journalled on the attachment and extending parallel to the mounting plate and toward and between the wing portions, said roller being located in a position such that when the attachment is mounted on the electrical fitting adjacent a wall opening and the cable passed through the opening and pulled through the open top, the upper side of the cable bears against the roller when viewed from the top.

* * * * *